United States Patent [19]

Mannas et al.

[11] Patent Number: 4,718,074
[45] Date of Patent: Jan. 5, 1988

[54] DEJITTERIZER METHOD AND APPARATUS

[75] Inventors: Earl L. Mannas, Laurel; Thomas H. Johnson, Jr., Westminster, both of Md.

[73] Assignee: SOTAS, Inc., Va.

[21] Appl. No.: 843,668

[22] Filed: Mar. 25, 1986

[51] Int. Cl.[4] .................................. H04L 7/00
[52] U.S. Cl. ........................... 375/118; 375/14; 375/120; 360/54; 369/60
[58] Field of Search .............. 375/118, 120, 14; 358/19, 148, 149; 360/54; 369/60; 364/900

[56] References Cited

U.S. PATENT DOCUMENTS

| | | | |
|---|---|---|---|
| 3,420,956 | 1/1969 | Heightley et al. | 375/118 |
| 4,054,747 | 10/1977 | Pachynski, Jr. | 375/118 |
| 4,270,018 | 5/1981 | Robinson et al. | 375/118 |
| 4,434,498 | 2/1984 | Mathieu | 375/118 |
| 4,596,026 | 6/1986 | Cease et al. | 375/118 |

*Primary Examiner*—James J. Groody
*Assistant Examiner*—Michael D. Parker
*Attorney, Agent, or Firm*—Lane and Aitken

[57] ABSTRACT

Dejitterizer apparatus is disclosed which uses a counter to track the number of bits stored in a 64-bit FIFO buffer. The counter is incremented on a falling edge of pulses of a timing pulse signal, nominally 6.176 Mhz, that coincides with a pulse of a jittered, nominally 1.554 Mhz, clock pulse signal derived from a jittered T1 signal applied to the input of the apparatus. The counter is decremented on the rising edge of pulses of a local clock pulse signal which is derived from the timing pulse signal. The bits are stored in the buffer in response to pulses of the jittered clock pulse signal. Output from the buffer in response to timing pulses derived from the local clock pulse signal is enabled when the counter indicates that the buffer is one-half full. The frequency of the local clock pulse signal is a function of the average frequency of the jittered clock pulse signal over more than sixteen jittered clock periods.

7 Claims, 1 Drawing Figure

DEJITTERIZER METHOD AND APPARATUS

BACKGROUND OF THE INVENTION

1. Field of the Invention

The present invention is related to digital transmission of voice and data. More particularly, the invention removes jitter commonly found in repeater-transmitted digital signals.

2. Discussion of Related Art

Regenerative repeaters that provide some form of correction for high frequency timing errors, commonly referred to as jitter, are known. U.S. Pat. No. 4,054,747 describes means for correcting phase errors in transmitted data. Errors exceeding one unit interval produces a reset. U.S. Pat. No. 4,270,183 describes means for removing jitter from digital signals played back from a magnetic tape recording, in which many bits of data are offset by phase errors as a result of jitter.

In the '183 patent, data is clocked into a multi-part cascaded FIFO buffer in response to a coincidence of a given pulse of the data clock and a pulse from a fixed-frequency local clock. Data is output in response to a coincidence between local and given clock pulses. The dejitterizer's output rate is reset in response to a half-full buffer status detected by tapping the "input ready" line of a FIFO device in the middle of the buffer. The rate at which data is output as a serial bit stream is a function of the amount of data in the buffer at a given moment, to maintain adequate "head room" in the buffer.

Dejitterizers are particularly important in transmission networks where frequent amplification is required to maintain adequate signal levels, such as T4 fiber optic systems, and in longdistance data links generally. For T1 carrier applications, where the suggested maximum jitter offset is eight bits wide*, only one 64-bit FIFO device is required. However, when only one FIFO device is used in the buffer, instead of the multiple devices disclosed in the '183 patent, the input ready signal from the buffer device cannot be used to control the FIFO buffer because it only indicates when the buffer is full. Some other means for accurately determining the "half-full" status must be provided when using a single FIFO device. Also, if an up-down counter is used to determine buffer status some means must be found to prevent a simultaneous up and down count inputs to assure an accurate count, since the signals which clock the input and the output of the FIFO buffer are effectively asynchronous.

*(Reference: Bell Systems Technical Reference Section 3.6, paragraph 3, FIG. 2 (Terminal Jitter Tolerance Recommended Template))

SUMMARY OF THE INVENTION

The present invention provides a simple, reliable correction for jitter in the digital transmission of voice and data signals.

In accordance with the present invention, data from a jittered signal is clocked into a first-in/first-out (FIFO) buffer by a jittered clock pulse signal derived from the jittered signal. The data is clocked out of the FIFO buffer by a local clock pulse signal. A counter is incremented by each jittered clock pulse and decremented by pulses of the local clock pulse signal. Means for preventing coincidence of said given and local clock pulses is provided, to assure that the count is accurate. The frequency of the local clock pulse signal varies as a function of the phase relation between the local and given clock pulse signals to prevent buffer overflow.

BRIEF DESCRIPTION OF THE DRAWING

The invention and its advantageous features will be more clearly understood when the detailed description of a preferred embodiment, given below, is considered in conjunction with the drawings.

The single feature of the drawing is a functional block diagram of the preferred embodiment.

DETAILED DESCRIPTION OF THE PREFERRED EMBODIMENT

Figure 1:
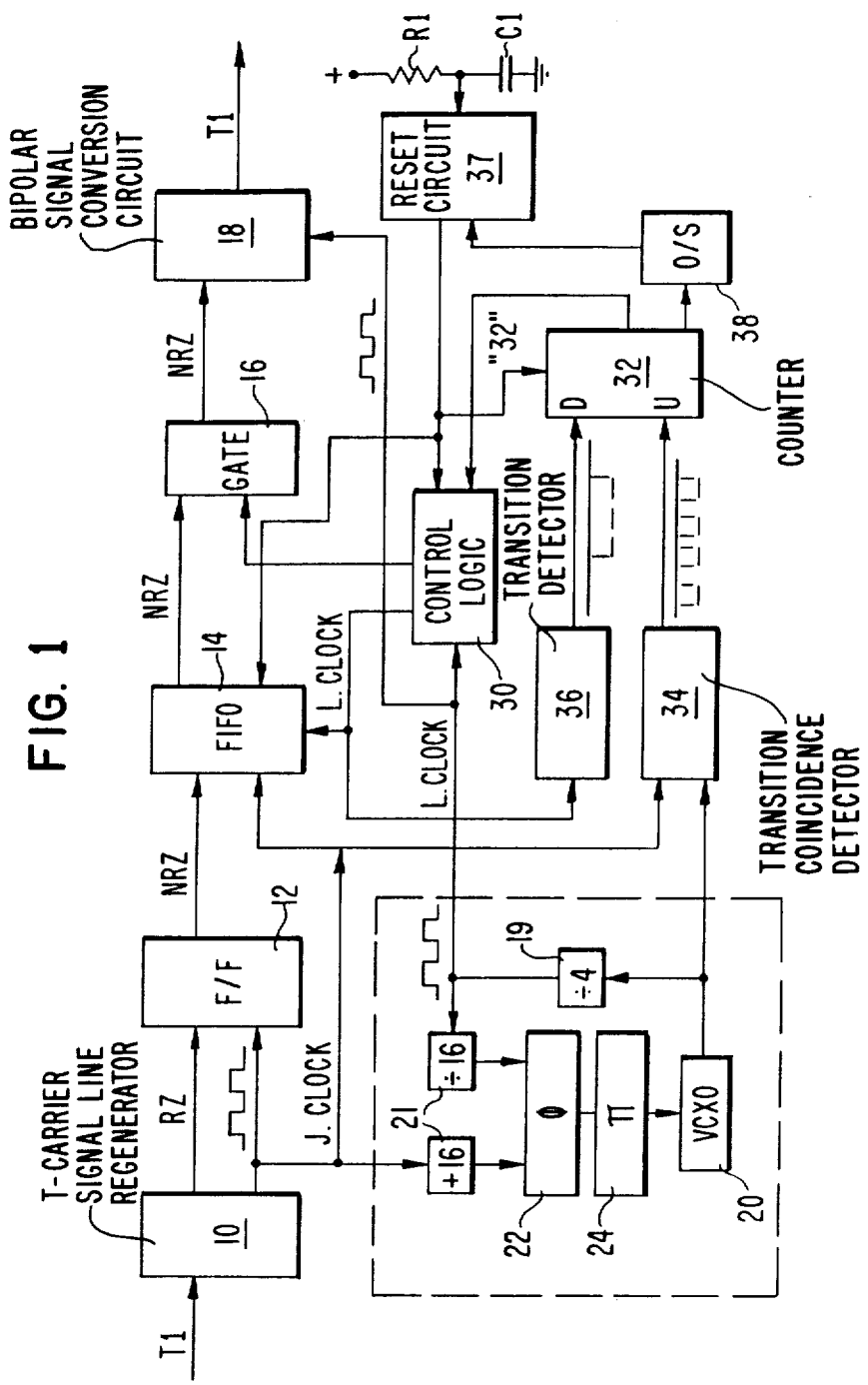

With reference to the drawing, apparatus in accordance with the preferred embodiment of the present invention comprises a standard T-carrier signal line regenerator 10 with automatic gain control, for use on T-1 carrier transmission lines. A T1 bipolar signal from a repeated line is supplied to the regenerator 10. The regenerator 10 separates the bit stream of the transmitted data, hereinafter referred to as "data signal" and transmitted clock pulse signal hereinafter referred to as the "jittered" clock pulse signal, from the T1 signal. The data signal from regenerator 10 is then supplied to a flip-flop circuit 12, which converts the return-to-zero (RZ) data signal into a non-return-to-zero (NRZ) data signal. The NRZ signal is supplied to a 64-bit first-in/first-out (FIFO) buffer 14, and then to a gate 16 and bipolar signal conversion circuit 18 which reconverts the NRZ signal into a balanced bipolar return-to-zero (BRZ) format. The regenerator 10 can be any one of a variety of well-known integrated circuit devices suitable for use with the T1 telecommunications signal format. The transmitted data rate and, therefore, the frequency of the transmitted clock pulse signal derived by the regenerator 10 from the T1 format signal is nominally 1.544 Mhz.

A local timing pulse signal is produced by a voltage-controlled crystal-oscillator (VCXO) 20 at a frequency of approximately 6.176 Mhz, which varies with the average frequency of the jittered clock. The frequency of the timing pulse signal is divided by 4 at frequency divider 19 to provide a substantially synchronous "local" clock pulse signal which is applied to the FIFO buffer 14 through control logic 30 to clock data out of the FIFO buffer 14.

The frequency of the VCXO 20 is controlled by a phase lock loop in which the frequency of the local clock pulse signal and the frequency of the jittered clock pulse signal are each divided by 16 in two dividers 21 and then supplied to a phase shift detector 22. The time between clock pulses when used to measure jitter offset is referred to as a "unit interval". Dividing the clock pulse signal frequency by 16 allows the phase lock loop to track up to 16 unit intervals of jitter.

The phase shift detector 22 outputs a variable duty cycle pulsed error voltage signal that varies with the phase difference between the local and jittered clock pulse signals. This signal is then filtered by a 20 db per decade (6 db per octave) active low-pass filter network 24 which provides a 3 db reduction at 4.5 Hz., before it is applied to the VCXO 20. Thus, the output voltage of the filter network 24 varies with the phase error between the output signals of the frequency dividers 21 averaged over an interval determined by the time constant of the filter network 24. Accordingly, at any given moment, the output of the VCXO 20 is a function of the weighted average of the phase error between the local clock and the jittered clock over more than 16 clock pulses of the jittered clock, because of the action of filter network 24. Determining phase shift over as many as one-fourth of the number of clock cycles required to fill the buffer is advantageous in that it smoothes potentially destabilizing step-function changes in the frequency of the jittered clock while assuring adequate headroom in the buffer to accomodate a normal range of frequency fluctuations.

The local clock pulse signal supplied to the FIFO buffer is enabled by control logic 30 in response to input from a 64-bit up-down counter 32. The up-down counter 32 is controlled by two transition detectors 34, 36. The transition coincidence detector 34 increases the count of the up-down counter 32 for each pulse of the jittered clock pulse signal applied thereto from the regenerator 10, on the falling edge of the next subsequent timing pulse signal applied thereto from the VCXO 20. Transition detector 36 decreases the count of up-down counter 32 for each pulse of the enabled local clock pulse signal applied to the transition detector 36 from the frequency divider 19 through control logic 30 on the rising edge of each enabled local clock pulse. This arrangement prevents up-counts and down-counts from occurring simultaneously, thus assuring accurate buffer control.

When the power switch is activated, the dejitterizer is initialized by the reset circuit 37. The reset circuit 37 holds the FIFO buffer 14 and the up-down counter 32 in a clear state and holds the control logic 30 in its reset mode for a predetermined time to allow the power supply to reach a stable voltage. That turn-on delay period is determined by the combination of resistor R1 and capacitor C1 is charged. When the predetermined time has elapsed, the FIFO buffer 14 and up-down counter 32 are enabled. The control logic 30 remains in the reset mode, in which it blocks the application of the local clock to the FIFO buffer, until the up-down counter 32 indicates that the FIFO buffer is half-full.

During the first few seconds that the phase-lock-loop is energized the up-down counter 32 will overflow and trigger the on shot 38. The firing of the one shot 38 provides a high signal to the input of the reset circuit 37, producing a low on the output which again clears the counter 32 and the FIFO buffer 14 and resets the control logic to cause it to block the local clock pulse signal while the phase-lock-loop attains lock. One shot 38 is activated by the presence of a count of "0" (empty) or "64" (full) in the updown counter 32. Thus, when the FIFO is clocked to an empty state—as a result of the T1 input signal being lost, for example—the one-shot provides a reset to reinitialize signal processing in the dejitterizer.

After being initialized by the output of the reset circuit 37, the up-down counter 32 counts up in response to input pulses from the transition coincidence detector 34. At this time the control logic 30 will be blocking the local clock pulse signal from reaching the FIFO buffer 14 and the transition detector 36 so that there is no clocking of data out of the FIFO buffer 14 and no count down of the counter 32. When the count in the up-down counter 32 of the pulses from coincidence detector 34 reaches "32" (half full) the up-down counter 32 outputs a signal to set the control logic 30 which enables the local clock pulse signal, thereby providing the local clock pulse signal to the FIFO buffer 14 and the transition detector 36.

While the local clock pulse signal is enabled, the counter 30 counts down in response to each local clock pulse and the FIFO buffer 14 outputs NRZ data to gate 16, which is enabled by a high signal from the control logic 30 that is applied to the input of gate 16 when the local clock pulse signal is enabled. The gate 16 then outputs the data received from FIFO buffer 14 to bipolar converter circuit 18 which is continuously supplied with the local timing pulse signal. The bipolar conversion circuit 18 converts NRZ data from gate 16 to the BRZ format and outputs a dejitterized T1 signal.

This invention has been described with particular reference to a presently preferred embodiment thereof but it will be readily understood by one skilled in the art that many variations and modifications thereof are possible within the spirit and scope of the present invention. For example, to correct more extensive digital time base errors, such as those produced by tape transports, multiple dejitterizer units may be supplied with the jittered signal sequentially, using progressively more stable local clocks to further minimize residual clock frequency deviation.

What is claimed is:

1. Dejitterizer apparatus comprising:
   means for separating a stream of given data bits and a given clock pulse signal associated therewith from a given signal;
   means for producing a local clock pulse signal;
   a buffer for storing said given data bits in response to the pulses of said given clock pulse signal and outputting said given data bits in response to the pulses of said local clock pulse signal;
   a counter for detecting the pulses of said given and local clock pulse signals to determine the number of given data bits stored in said buffer as a function of the difference between the number of said given clock pulses and said local clock pulses that are supplied to said buffer;
   means for controlling the time at which said given and local clock pulses are detected by said counter to prevent simultaneously detecting a local clock pulse and a given clock pulse, to provide an accurate determination of the number of given data bits in said buffer; and
   means for varying the frequency of said local clock pulse signal as a function of the phase relation between said local clock pulse signal and said given clock pulse signal, whereby buffer overflow is prevented.

2. Dejitterizer apparatus as claimed in claim 1 wherein said means for controlling the time at which said given and said local clock pulses are detected by said counter comprises means for producing a timing pulse signal that has a frequency that is a whole number multiple of the local clock pulse signal and substantially in synchrony therewith, said timing pulse signal comprising a series of timing pulses each having a leading edge and a trailing edge, means for causing each pulse of said local clock pulse signal applied to said counter to be detected by said counter on a predetermined one of said leading and trailing edges of a respective timing pulse, and means for causing each given clock pulse to be detected by said counter on the other one of said leading and trailing edges of a respective timing pulse so that the two clock pulse signals are detected on opposite edges of said respective timing pulses, respectively.

3. Dejitterizer apparatus comprising:
   means for separating a stream of data bits and a clock pulse signal associated therewith from a given signal;
   means for producing a local clock pulse signal;

a buffer for storing said given data bits in response to the pulses of said given clock pulse signal and outputting said given data bits in response to the pulses of said local clock pulse signal;

a counter for detecting the number of given data bits stored in said buffer as a function of the difference between the number of said given clock pulses and said local clock pulses that are supplied to said buffer;

means for controlling the time at which said given and local clock pulses are detected by said counter to prevent simultaneously detecting a local clock pulse and a given clock pulse, to provide an accurate determination of the number of given data bits in said buffer; and means for varying the frequency of the local clock pulse signal as a function of the average frequency of a predetermined number of pulses of said given clock pulse signal, whereby buffer overflow is prevented.

4. Dejitterizer apparatus as claimed in claim 3 wherein said predetermined number is up to one-fourth of the number of bits that can be stored in said buffer.

5. Dejitterizer apparatus as claimed in claim 3 further comprising reset means for resetting said counter and clearing said buffer when said counter indicates that said buffer is full or empty and interrupting the output of data from said buffer until said buffer is half full.

6. A method for dejitterizing a given jittered signal comprising the steps of:

separating a stream of data bits and a jittered clock pulse signal from said given jittered signal;

storing said data bits in response to respective pulses of said jittered clock pulse signal;

generating a local clock pulse signal;

generating a timing pulse signal synchronous with said local clock pulse signal and comprising a series of timing pulses each having a leading edge and a trailing edge;

incrementing a counter in response to the coincidence of respective pulses of said jittered clock pulse signal with a a predetermined one of said leading and trailing edges of a respective timing pulse;

enabling the output of said stored data bits when said counter becomes partially full;

outputting said stored data bits in response to respective pulses from said local clock pulse signal; and decrementing said counter in response to pulses of said local clock pulse signal at the time of occurrence of the one of said leading and trailing edges of a respective timing pulse other than said predetermined one, thereby providing an accurate determination of the number of data bits in said buffer.

7. A method as claimed in claim 6 further comprising the steps of:

determining the phase difference between said local clock pulse signal and said jittered clock pulse signal; and varying the frequency of said timing pulse signal as a function of the phase difference between said local clock pulse signal and said jittered clock pulse signal.

* * * * *

UNITED STATES PATENT AND TRADEMARK OFFICE
CERTIFICATE OF CORRECTION

PATENT NO. : 4,718,074
DATED : January 5, 1988
INVENTOR(S) : Michael Horn

It is certified that error appears in the above-identified patent and that said Letters Patent is hereby corrected as shown below:

Column 1, line 23 change "penerate" to --penetrate--
Column 2, line 58 change "trnsducer" to --transducer--
Column 3, line 10 change "FIG. 5" to --FIG. 3--
Column 4, line 6 delete "the"
Column 7, line 10 change ".002 ∝ " to --.002"--
Column 7, line 12 change "Ray" to --ray--
Column 7, line 54 change "value of incidence" to --value of the angle of incidence--
Column 8, line 26 change "detector" to --detector.--
Column 8, line 40 change "herein" to --having--
Column 8, line 44 change "housing," to --housing;--
Column 8, line 46 change "surface" to --surface,--
Colum 8, line 50 change "X-rays; and detector" to --X-rays; and detector--

Column 8, line 67 change "has means sample" to --has means to sample--
Column 9, line 6 change "having means synchronize" to --having means to synchronize--
Column 9, line 26 change "and an (X-ray" to --and an X-ray--

Signed and Sealed this

Twenty-first Day of June, 1988

Attest:

DONALD J. QUIGG

Attesting Officer

Commissioner of Patents and Trademarks